US006039496A

United States Patent [19]

[11] Patent Number: 6,039,496

Bishop

[45] Date of Patent: Mar. 21, 2000

[54] RETRACTOR CABLE CONNECTOR FOR TETHERED PRODUCT DISPLAY

[75] Inventor: J. Merrill Bishop, Lansdale, Pa.

[73] Assignee: Vulcan Spring & Manufacturing Company, Telford, Pa.

[21] Appl. No.: 09/016,059

[22] Filed: Jan. 30, 1998

[51] Int. Cl.[7] .................................................... F16G 11/00

[52] U.S. Cl. .......................... 403/4; 248/205.3; 248/500; 248/683; 340/568.2; 340/568.3; 340/568.4; 24/304; 403/187

[58] Field of Search ............................. 340/568.2, 568.3, 340/568.4, 568.8, 571; 24/304, 130; 248/205.3, 500, 683; 403/3, 4, 187

[56] References Cited

U.S. PATENT DOCUMENTS

| | | | |
|---|---|---|---|
| 1,238,532 | 8/1917 | Lemberg | 200/61.62 |
| 2,780,689 | 2/1957 | Cavera | 340/548 |
| 3,932,857 | 1/1976 | Way et al. | 340/568.2 |
| 4,340,884 | 7/1982 | Maizland | 340/548 |
| 4,432,120 | 2/1984 | Sherman et al. | 24/304 |
| 4,536,754 | 8/1985 | Holce et al. | 340/568.2 |
| 4,962,369 | 10/1990 | Close | 340/568.2 |
| 5,072,213 | 12/1991 | Close | 340/568.2 |
| 5,124,685 | 6/1992 | Rankin | 340/568 |
| 5,146,205 | 9/1992 | Keifer et al. | 340/568.8 |
| 5,565,848 | 10/1996 | Leyden et al. | 340/568.2 |
| 5,574,430 | 11/1996 | Ott et al. | 340/568.2 |
| 5,886,633 | 3/1999 | Adams | 340/568.2 |
| 5,910,768 | 6/1999 | Ott | 340/568.2 |

OTHER PUBLICATIONS

Vulcan Pullbox® Brochure, Vulcan Spring & Mfg. Co., 1996.

*Primary Examiner*—Harry C. Kim
*Assistant Examiner*—Ken Thompson

[57] ABSTRACT

A device for connecting the bitter end of a cable to a product in a tethered product display. The display has a panel with a small hole sized slightly larger than the diameter of the cable, and the device is secured to the cable after the cable is extended through the hole from a cable retractor located behind the panel.

20 Claims, 2 Drawing Sheets

RETRACTOR CABLE CONNECTOR FOR TETHERED PRODUCT DISPLAY

FIELD OF THE INVENTION

The present invention relates to tethered product displays, and more particularly, the present invention relates to a connector for attaching a product to a retractable tether.

BACKGROUND OF THE INVENTION

In a tethered product display, such as disclosed in U.S. Pat. No. 5,124,685, owned by the Assignee of the present application, a retractor and sensor, located behind a panel in the product display, senses a severing of the product display tether and sounds an alarm of an impending theft of a product connected to the tether as the retractor rewinds the tether. In tethered product displays where an alarm function is not desired, a Pullbox® cable retractor manufactured by the Assignee of the present application may be used satisfactorily.

While it is desirable to locate the retractor behind a display panel, there are problems in attaching the product to the bitter end of the tether. This is because the product attachment device is usually too large to pass readily through a small hole. This necessitates the formation of a large hole in the display panel, but this is both unsightly and difficult to do in the field. The use of a small hole would solve this problem, but a small hole makes it necessary to secure the attachment device to a product in the field by first inserting the cable bitter end from rear to front through the small hole and then securing the bitter end of the tether to the product to be displayed. Heretofore, a key-ring has been used, but not entirely satisfactorily.

A satisfactory product attachment device needs to provide a secure tether connection to the product and yet be tamper-proof to preclude disconnection from the product. Moreover, the securement device needs to be capable of attachment readily without special tools or special skills, and it needs to be inexpensive to manufacture.

OBJECTS OF THE PRESENT INVENTION

With the foregoing in mind, a primary object of the present invention is to provide a novel product attachment device which can be readily secured to a cable in a tethered product display yet which does not require a large hole in a display panel.

Another object of the present invention is to provide a unique product attachment device which can be quickly installed without special tools or special skills.

A further object of the present invention is to provide a product attachment device which can be manufactured inexpensively.

As a still further object, the present invention provides a product display and method of assembly which requires only a small panel hole yet which allows a novel large connector to be fastened to the product tether and to the product.

SUMMARY OF THE INVENTION

More specifically, the present invention provides a product securement device which enables a retractor cable in a tethered product display to be readily secured to a product in a tamper resistant manner. To this end, the securement device comprises a base having a cable guideway which opens into a protrusion having a recess for receiving a terminal end fitting on the bitter end portion of a cable, or tether. A locking element having a slot affording lateral engagement with the cable adjacent to the terminal end fitting has a surface which operably engages the recess surface when the cable is disposed in the cable guideway and tensioned. Preferably, the locking element is molded integral with the base and is releasably connected thereto by a fracturable web. Various means are provided on the base for fastening the base mounting surface to the product in a manner that resists disconnection. A preferred fastening means includes a double-sided adhesive tape which is installed across the cable guideway and recess to capture the locking element until the connector is attached to the product.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
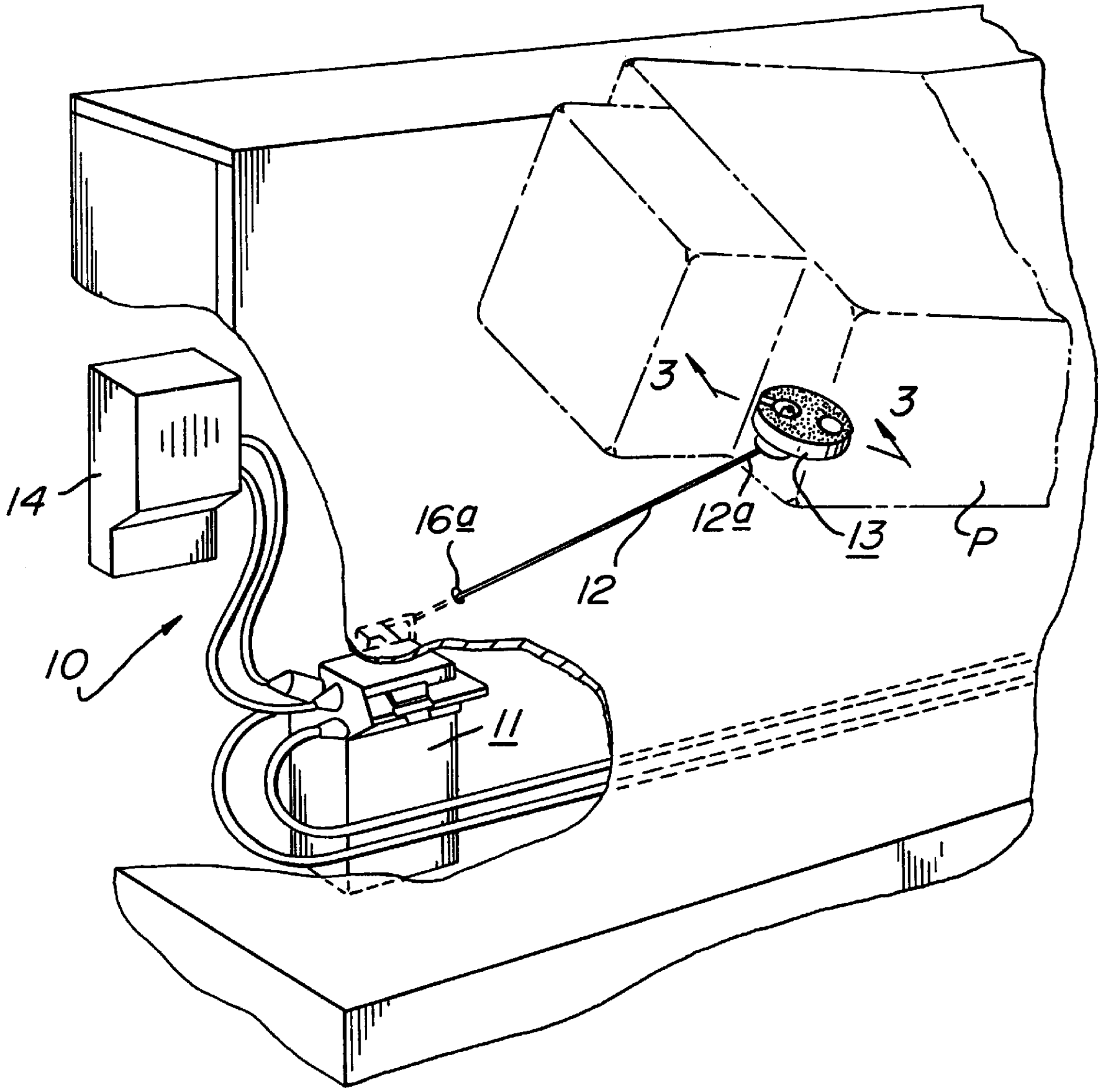
FIG. 1 is a perspective partially broken-away view of a tethered product display having a retractor cable connector embodying the present invention.

Referring now to the drawings, FIG. 1 illustrates a tethered product display 10 such as illustrated and described in Applicant's U.S. Pat. No. 5,124,685. As described in that patent, the tethered product display 10 includes a retractor 11 which has a tether, or cable, 12 that is attached to a product P by means of a connector, or product securement device, 13. The retractor may incorporate a sensor which is electrically connected to a sound emitting device, such as an alarm, 14 mounted in the product display behind a panel 16. The panel 16 has a hole, 16*a,* through which the tether 12 passes, enabling it to extend when the product P is pulled and to retract in response to a spring provided in the retractor 11. For a more complete description of operation of a retractor having a sensor and alarm, reference is made to U.S. Pat. No. 5,124,685, the disclosure of which is incorporated by reference herein.

Figure 3:
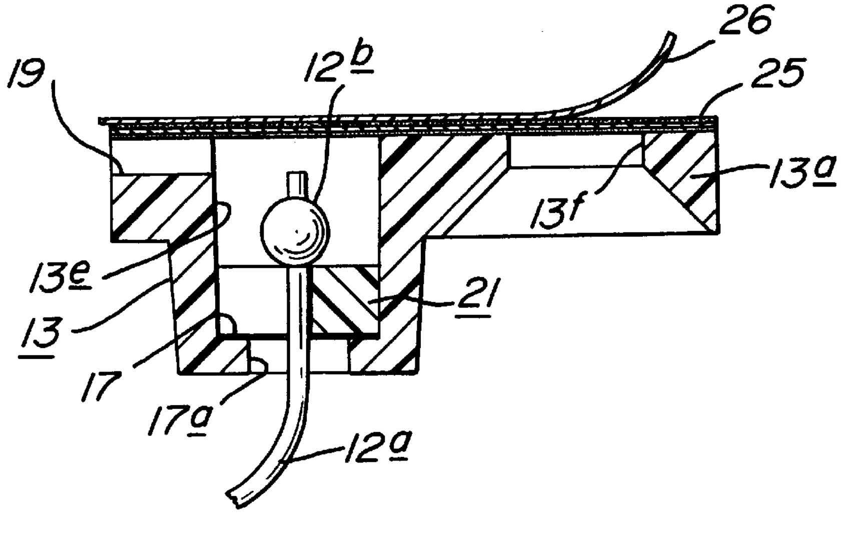
FIG. 3 is a transverse sectional view taken along on 3—3 of FIG. 1.
Figure 2:
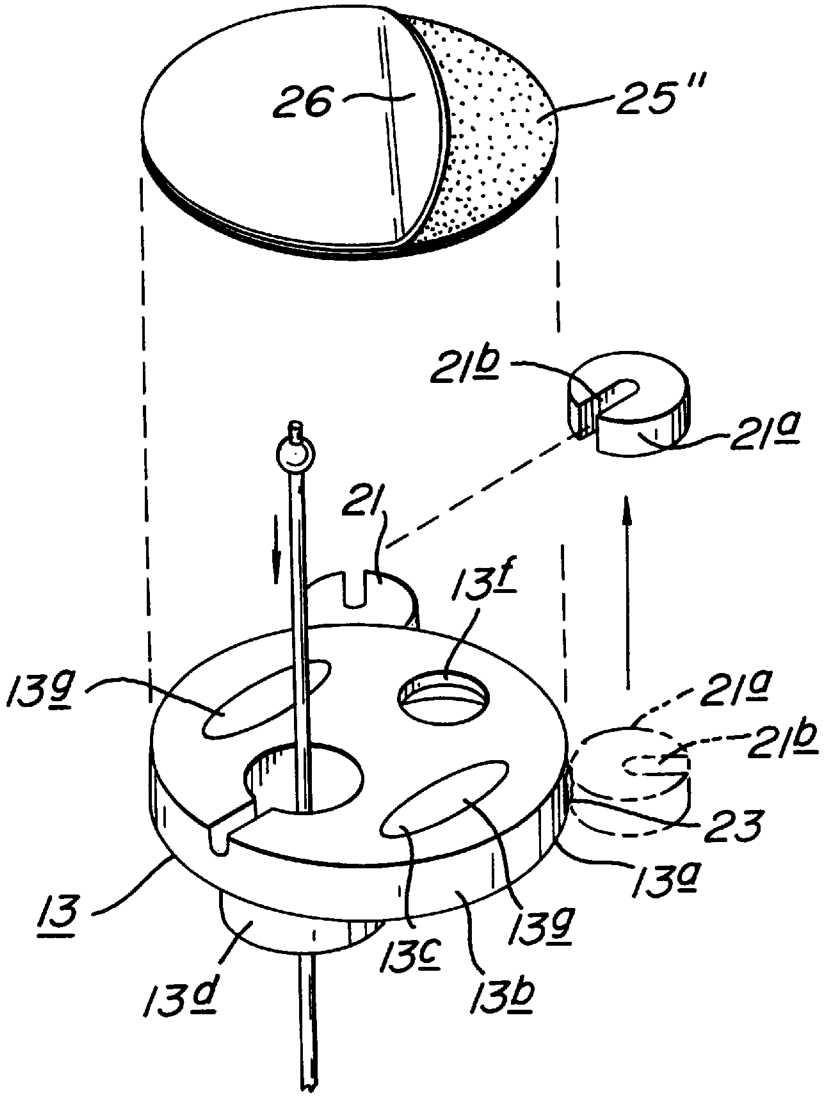
FIG. 2 is an exploded perspective view of the cable connector.

According to the present invention, the retractor cable connector 13 connects the bitter end portion 12*a* of the cable 12 to the product P in a secure manner which requires only a small hole 16*a* to be provided in the panel 16. To this end, as best seen in FIG. 2, the connector 13 has a base portion 13*a* with a circular outer periphery 13*b*. The connector 13 has a rear planar product mounting surface 13*c* and a front side with a protrusion 13*d* having a recess 13*e* (FIG. 4) opening rearward to the rear product mounting surface 13*d*. The protrusion 13*d* has an annular shoulder 17 with a central circular aperture 17*a* providing a first cable guideway sized to enable the cable bitter end 12*b* to pass into the recess 13*e* from front to rear as shown in FIG. 3. The base 13*a* also has a second cable guideway formed by a radial channel 19 opening to the rear product mounting surface 13*d* and extending between the outer periphery of the base 13*a* and the recess 13*e* to enable the cable bitter end portion 12*b* to be laid radially in the manner shown in FIG. 4 with the cable end terminal fitting 12*b* disposed in the recess 13*e* as shown.

To secure the cable bitter end fitting 12*b* in the recess 13*e,* the connector includes a locking clip 21. As best seen in FIG. 2, the locking clip 21 is preferably molded integral with the periphery of the base 13*a,* as shown in phantom lines in FIG. 2. The locking clip 21 has a radial slot 21*b* slightly larger than the cable diameter to receive the bitter end portion of the cable 12*b*. The size of the slot 21*b* is sufficiently small as to preclude passage of the cable terminal end fitting 12*b*. The outer periphery of the locking clip 21 is complementary with the shape of the surface of the inside of the recess 13*e,* and is larger in size than the recess aperture 17*a*. In the illustrated embodiment, the locking clip 21 is circular, as is the inner peripheral surface of the recess 13*e,* but the clip and recess may be of any shape.

As best seen in FIG. 3, when the locking clip 21 is laterally engaged with the bitter end portion 12*b* of the cable 12, and the cable 12 is tensioned in the direction shown in FIG. 3, the locking clip 21 engages the shoulder 17*a* in the recess 13*e* and prevents the cable 12 from being disconnected from the connector 13. If desired, the locking clip 21 can be connected to the bitter end portion 12*b* of the cable 12 in the manner shown in FIG. 4 to provide a lateral cable run when such is desired in connection with certain products. When so connected, the complementary peripheral outer surface of the locking clip 21 reacts relative to the inner surface of the recess 13*e* to aid frictionally in retaining the bitter end portion of the cable 12 engaged with the product P and connector 13 when tension is applied to the cable 12 in the direction shown in FIG. 4.

To positively connect the connector 13 to a product, such as the product P illustrated in FIG. 1, various means are provided on the base of connector 13. A preferred means includes a double-sided adhesive laminate 25 applied across the base mounting surface 13*c* and having opposed peelable covers 26 enabling adhesive 25" to be exposed for attachment to a product surface, such as shown in FIG. 1. The adhesive laminate 25 is applied after the clip 21 has been secured to the cable bitter end portion 12*b* in the connector recess 13*c* to capture the locking clip 21. This has the advantage of enabling the connector 13 to be connected to the cable and the product P subsequently secured to the connector 13. Alternatively, the connector base 13*a* may be provided with circular attachment holes 13*f* for fasteners, such as threaded fasteners, rivets, or the like (not shown) that pass through the hole 13*f* in the base 13*a* and into the product P, and the base 13*a* may be provided with a pair of elongate holes 13*g* for receiving conventional tie straps.

In its as manufactured condition, the connector 13 has a pair of the locking clips 21 molded of plastic integral with the outer periphery of the base as shown in FIG. 2 and connected thereto by a fracturable or breakaway web 23. One clip, or the other, may be broken off, such as the clip 21*a* in FIG. 2 for connection to the cable bitter end. The remaining clip, which is a spare, may be either broken off and discarded or may be utilized in case the first clip has been lost during assembly. Alternatively, one clip may have a larger slot size for a larger diameter cable. Furthermore, clips 21 may be molded separate from the connector 13.

Figure 4:
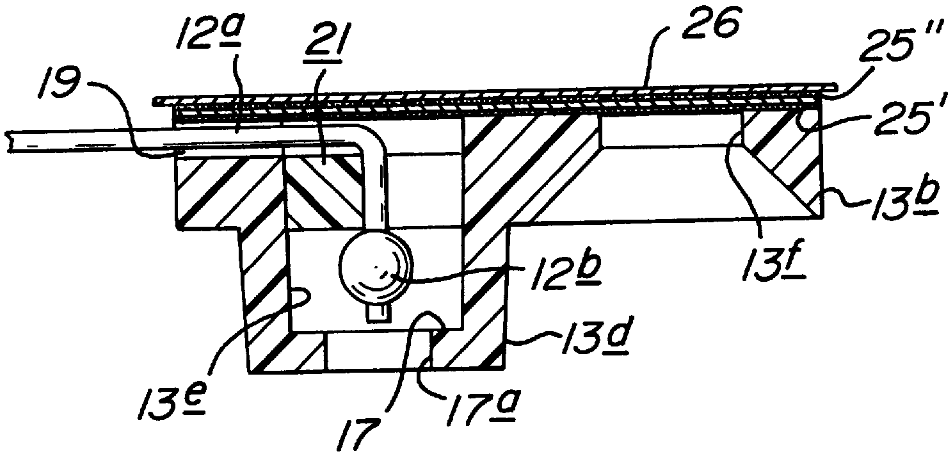
FIG. 4 is a sectional view similar to FIG. 3, but illustrating the cable connector in a different mode of attachment to a product tether.

Installation of the connector 13 is straightforward. At the product display location, the bitter end portion 12*b* of the cable 12 is inserted from behind the panel 16 through the small (less than ¼ inch diameter) hole 16*a* and held with one hand. The cable bitter end 12*b* is fed through either cable guideway in connector base 13. One of the locking clips 21*a* is broken away from the base 13 and engaged with the cable bitter end 12*b,* as shown in either FIG. 3 or FIG. 4 to seat in the recess as shown. One laminate adhesive cover 26 is removed, to expose the adhesive 25' which is placed against the connector base surface 13*c* (FIG. 4). Then the other adhesive cover 26 is removed and the exposed adhesive 25" is placed against the product P and held for a short time to effect a strong tamper resistant bond. In addition, or alternatively, a threaded fastener may be connected to the product through the hole 27, or a tie strap may be fed through slots 13*g* and attached to the product P.

In view of the foregoing, it should be apparent that this invention now provides an improved cable connector which can be manufactured readily and installed in the field without any special skills or tools.

While a preferred embodiment of the present invention has been described in detail, various modifications, alterations and changes may be made without departing from the spirit or scope of the present invention as defined in the appended claims.

I claim:

1. A device for securing a retractor cable to a product in a tethered product display, comprising:

a base having a cable guideway opening into a recess for receiving a terminal end fitting of a cable and having a rear mounting surface juxtaposed with respect to said guideway and said recess, and a locking element having a slot affording lateral engagement with said cable adjacent to said terminal end fitting and having a surface operably engagable with said recess surface when said cable is disposed in said cable guideway and tensioned such that said locking element fits within said recess but not through said cable guideway, and means on said base for fastening said base mounting surface to said product in an abutting relationship such that said recess is closed by the product and said locking element is blocked from exiting said recess.

2. The device according to claim 1 including a fracturable web connecting said locking element to said base.

3. The device according to claim 2 when said base and locking element are of molded plastic construction.

4. The device according to claim 3 wherein said locking element extends from a peripheral portion of said base in its as-molded condition.

5. The device according to claim 1 wherein said cable guideway includes a channel in said base rear mounting surface.

6. The device according to claim 1 wherein said cable guideway includes an aperture opening into said recess.

7. The device according to claim 1 wherein said fastening means includes an adhesive layer on said base mounting surface.

8. The device according to claim 7 wherein said adhesive layer includes a removable protective cover.

9. The device according to claim 1 including at least one hole in said base for receiving a fastener.

10. The device according to claim 1 including a plurality of locking clips formed integral with said base as manufactured and each connected thereto by said fracturable web.

11. A device for securing a retractor cable to a product in a tethered product display, comprising:

a base plate having a front side and a rear side, said rear side having a mounting surface adapted to be fastened to a product in an abutting relationship and having a recess which is open on said rear side, said base plate having an aperture for receiving a retractor cable with a terminal end fitting inserted through the aperture from front to rear and into said recess, a locking clip capable of fitting into said recess but not through said aperture and having a slot laterally engaging said retractor cable inwardly of the terminal end fitting of the retractor cable for preventing said end fitting from passing reversely through the aperture from rear to front when tension is applied to the retractor cable, and means on said plate for fastening said rear side to said product to close said recess after said locking clip has been installed so that said locking clip is prevented from exiting said recess.

12. A device according to claim 11 wherein said locking clip is initially formed integral with the plate and is secured thereto by a fracturable web affording a breakaway connection to facilitate assembly at the product display location.

13. A device according to claim 12 wherein said base plate and locking clip are of one-piece molded plastic construction.

14. A device according to claim 13 wherein said base plate has an outer periphery and said locking clip is formed integral with said periphery and connected thereto by said fracturable web.

15. A device according to claim 14 including a plurality of said locking clips similarly connected to said base plate periphery.

16. A device according to claim 11 wherein said fastening means includes a double-sided adhesive having one side secured to the rear of said base plate and its other side adapted to be secured to the product.

17. A device according to claim 11 wherein said fastening means includes a hole for receiving a fastener.

18. A device for securing a retractor cable bitter end portion to a product in a tethered product display, comprising:

a base having a periphery and planar rear mounting surface adapted to be secured to a product, said base having a recess opening into said mounting surface and a cableway channel connecting said recess to an edge of said periphery of said base, said recess having a shoulder surrounding an aperture at the front of said recess;

at least one locking element extending from said periphery, said locking element having a peripheral edge sized and shaped to fit within said recess but not through said cableway channel and said aperture, a fracturable web connecting said at least one locking element to said base peripheral edge enabling said locking element to be separated manually from said base, and means on said base for fastening said rear mounting surface of said base to said product in an abutting relationship after said retractor cable is placed either in said cable guideway channel or through said recess aperture with said locking element engaged therewith inwardly adjacent the cable bitter end such that said recess is closed by the product and said locking element is blocked from exiting said recess.

19. The device according to claim 18 wherein said base, clip and fracturable web are molded integral, as manufactured.

20. In a tethered product display having a panel with a hole permitting a tether having a bitter end portion to extend and retract from a retractor located behind the panel to afford manipulation of a tethered product in front of the panel, the improvement comprising:

a connector having a base adapted to be fastened to a product and a recess for receiving the tether bitter end portion, said base having a cable guideway opening into said recess for receiving the tether bitter end portion and having a rear mounting surface juxtaposed with respect to said guideway and said recess, a locking clip engagable with said recess and said bitter end portion for securing said tether to said connector, said locking clip having a slot affording lateral engagement with said tether adjacent to said bitter end portion and having a surface operably engagable with said recess when said tether is disposed in said cable guideway and tensioned such that said locking element fits within said recess but not through said cable guideway, and means on said base for fastening said base mounting surface to the product in an abutting relationship such that said recess is closed by the product and said locking element is blocked from exiting said recess, said connector being larger in size than said panel hole to preclude passage of the connector through the panel from front to rear.

* * * * *